United States Patent
Zanconato

(10) Patent No.: US 12,454,730 B2
(45) Date of Patent: Oct. 28, 2025

(54) TANNERY PRODUCT FOR OXIDATIVE HAIR REMOVAL TREATMENT OF ANIMAL HIDES AND SKINS AND RELATIVE METHOD

(71) Applicant: Leder Chimica SRL, Arzignano (IT)

(72) Inventor: Enrico Zanconato, Arzignano (IT)

(73) Assignee: Leder Chimica SRL, Arzignano (IT)

( * ) Notice: Subject to any disclaimer, the term of this patent is extended or adjusted under 35 U.S.C. 154(b) by 846 days.

(21) Appl. No.: 17/638,128

(22) PCT Filed: Aug. 19, 2020

(86) PCT No.: PCT/IT2020/050206
§ 371 (c)(1),
(2) Date: Feb. 24, 2022

(87) PCT Pub. No.: WO2021/038607
PCT Pub. Date: Mar. 4, 2021

(65) Prior Publication Data
US 2022/0364190 A1 Nov. 17, 2022

(30) Foreign Application Priority Data
Aug. 30, 2019 (IT) .......................... 102019000015300

(51) Int. Cl.
*C14C 1/06* (2006.01)
(52) U.S. Cl.
CPC ..................................... *C14C 1/06* (2013.01)
(58) Field of Classification Search
CPC ....................................................... C14C 1/06
See application file for complete search history.

(56) References Cited

U.S. PATENT DOCUMENTS

| | | | | |
|---|---|---|---|---|
| 2,157,969 | A | * 5/1939 | Rohm | ................... C14C 1/065 |
| | | | | 8/94.1 R |
| 5,376,042 | A | * 12/1994 | Reber | ...................... C14C 1/06 |
| | | | | 424/45 |
| 2007/0037934 | A1 | * 2/2007 | Kluglein | .............. C11D 3/3757 |
| | | | | 524/548 |
| 2008/0104767 | A1 | 5/2008 | Santori et al. | |

FOREIGN PATENT DOCUMENTS

| | | |
|---|---|---|
| DE | 284 695 A5 | 11/1990 |
| GB | 1106391 | 3/1968 |
| JP | 2008-514775 A | 5/2008 |
| JP | 2014-198843 A | 10/2014 |

OTHER PUBLICATIONS

J. Kanagaraj, R.C. Panda, T. Senthilvelan, Green remediation of sulfide in oxidative dehairing of skin and correlation by mathematical model: An eco-friendly approach, Process Safety and Environmental Protection, vol. 100, 2016, p. 36-48; ISSN 0957-5820, https://doi.org/10.1016/j.psep.2015.12.005.*

International Search Report in PCT/IT2020/050206 issued Nov. 27, 2020.

Written Opinion of the International Searching Authority in PCT/IT2020/050206 issued Nov. 27, 2020.

Kanagaraj, J., et al., "Green remediation of sulfide in oxidative dehairing of skin and correlation by mathematical model: An eco-friendly approach," Process Safety and Environmental Protection, vol. 100 (2016), pp. 36-48.

* cited by examiner

*Primary Examiner* — Amina S Khan
(74) *Attorney, Agent, or Firm* — Knobbe, Martens, Olson & Bear, LLP

(57) ABSTRACT

A tannery product designed to be introduced into a bath for oxidative hair removal treatment of animal hides and skins includes a perhydrate compound, an alkalizing agent and an activating agent. The treatment bath can be used in a method for oxidative hair removal of animal hides and skins. The method includes introducing the activating agent into the bath in a proportion to the weight of the hide and skin to be treated between 0.0001 and 0.01.

12 Claims, No Drawings

TANNERY PRODUCT FOR OXIDATIVE HAIR REMOVAL TREATMENT OF ANIMAL HIDES AND SKINS AND RELATIVE METHOD

This invention relates to a tannery product for oxidative hair removal treatment of animal hides and skins and the relative method.

The invention is generically inserted in the field of tannery treatments, and relates to a new type of product that can be used, in particular, for the execution of the hair removal step of hides and skins, and its relative method.

As is known, the method of treating animal hides and skins currently comprises a series of consecutive treatment steps, which are carried out using numerous different types of chemical products.

This method traditionally includes a series of operations, from preliminary operations to the actual tanning, to be carried out on previously treated hides and skins in order to slow down the normal putrefaction processes that such organic materials would undergo if untreated.

These are the so-called "raw hides", the starting material for every tannery method, which are then introduced into the so-called "Riviera phase", also simply called the Riviera.

The Riviera includes all those operations, prior to the tanning itself, which aim to facilitate the penetration of tanning compounds into the organic tissue, in particular in the collagen.

A fundamental operation belonging to the Riviera phase is the hair removal, which consists in removing the hair or fur from the surface layers of the hide and skin through a treatment in a strongly alkaline environment.

Conventionally, this operation is carried out by means of chemical products with a high pollutant load, which is harmful to the environment and to the operators handling them; these include sodium sulphide, sodium sulphydrate, thiolate compounds and dimethylamines.

A recent alternative to the use of such products, which, however, has not been able to establish itself on the market because of its cost compared to traditional methods, is the use of hydrogen peroxide. Moreover, although it is totally environmentally friendly, it is not yet possible to use hydrogen peroxide to replace traditional products, due to the following reasons:

- the storage of peroxides is notoriously complicated and difficult to implement, due to the natural instability of this category of substances and their tendency to decompose into water and gaseous oxygen, which also increases their potential hazardousness;
- in order for it to be used in tannery methods, hydrogen peroxide is introduced using coordination compounds, such as perborates, however, this class of compounds is universally recognised as being extremely toxic and carcinogenic;
- the yield of the method is lower, as large quantities of active substance are required in order to complete the treatment;
- finally, the quality of the leather obtained is worse than that obtained by traditional methods.

It is clear, therefore, that there is a need for a viable, low environmental impact alternative to the use of traditional compounds for tanning hides and skins, and in particular for hair removal, whilst maintaining the high quality of the finished product and the yield of the method.

The main aim of the invention is to produce a tannery product for oxidative hair removal treatment of animal hides and skins which is able to overcome the drawbacks described above, solving the problems of the prior art, for example related to the toxicity of wastewater from traditional products. Another aim of the invention is to provide a method which implements the use of the product for oxidative hair removal in an effective and economical manner.

In particular, the invention aims to provide a method which is economical, simple to perform and maintains high quality standards, without using harmful substances.

Another aim of the invention is to improve the health and safety of the plants for the treatment of hides and skins, while at the same time increasing the quality of the environment for operators in the sector.

A further aim of the invention is to provide a product and a method for an oxidative hair removal treatment of animal hides and skins which is non-destructive, and which allows recovery of the removed hair or fur, making it available for use in subsequent operations carried out by specialised companies; this gives an added value to the hide or skin, since what is a conventionally a waste product, to be disposed of upon payment, is transformed into a marketable by-product, bringing a considerable economic return.

These and other aims are achieved by a tannery product for oxidative hair removal of animal hides and skins according to claim 1 and the related method according to claim 8; further technical characteristics and details of the invention are indicated in the dependent claims.

This invention will now be described by way of non-limiting example according to some of its preferred embodiments.

A first embodiment of the invention is based on the use, at moderate temperatures, of a coordination compound comprising sodium carbonate and hydrogen peroxide; this compound is usually identified by the name of sodium carbonate-hydrogen peroxide (2/3), meaning that the two chemicals are respectively present in the molecule in a weight ratio of 2:3. Nevertheless, it should be noted that it is possible to use, instead of sodium percarbonate or in combination with it, any other perhydrate chemical compound capable of releasing hydroperoxide anions in aqueous solution. In order to implement the invention operationally, it is possible to proceed, in a traditional way, by preparing a water-based treatment bath, in which to dissolve these perhydrate compounds and all the remaining compounds which will be described later, creating a solution; inside the bath will be placed the hides and skins subject to the oxidative hair removal treatment. Sodium percarbonate is a compound already known at industrial level and is used as a detergent also in combination with hydrogen peroxide; after being introduced in solution, it first undergoes decomposition, which allows sodium carbonate and hydrogen peroxide to be obtained according to the following reaction: $2 (Na_2CO_3 \cdot 1.5 H_2O_2) \rightarrow 2 Na_2CO_3 + 3 H_2O_2$.

Subsequently, the sodium carbonate produced dissociates into sodium cations and carbonate anions, whilst the hydrogen peroxide decomposes into water and oxygen.

In this case, the sodium carbonate plays the role of preliminary alkalizing agent for the aqueous solution and is preferable to use, both because of its zero environmental impact and because of its ability to bind large quantities of hydrogen peroxide, at the same weight, compared to similar substances, leading to an improvement in the yield of the treatment.

Currently, in fact, the prior art technique comprises a minimum indispensable use of $H_2O_2$ 130 Vol. (1 Vol.=1 litre of oxygen developed) equal to approximately 9-12% with respect to the weight of the hide and skin to be treated; the solution according to the invention makes it possible to advantageously lower this ratio until halving it, causing a considerable saving of raw material and a simplification in the operations of supply and storage of the same.

In addition, one of the reasons why sodium percarbonate is still not widely used in the treatment of hides and skins is related to an incompatibility between the process parameters tolerable by the hides and skins and the physical-chemical parameters of the reactions involved.

In detail, the current technique makes it possible to obtain a generation of hydroperoxide anions through the reaction of the sodium percarbonate only at temperatures above 30° C. and ideally around 40-60° C.; however, the proteins of which the raw hides and skin are composed would be denatured and/or degraded, fully or partly, if exposed to such high temperatures, causing irreversible damage to the hide and skin itself.

For this reason, this route has remained de facto impracticable so far in the tannery industry, which has not been able to reach an acceptable compromise between the quantity of hydroperoxide anions made available in solution, the alkalinity of the solution itself and the process temperatures generated.

The product and the method for oxidative hair removal treatment, which are the subject of the invention, solve these problems by means of a series of measures relating to the preparation of the treatment bath.

Specifically, the invention is based on a particular and ingenious combination of sodium percarbonate with one or more different alkalizing agents, together with one or more activators, the latter having the task of promoting the production of the hydroperoxide anions and the peroxyacids. The addition of alkalizing agents in the treatment bath takes place initially before the introduction of sodium percarbonate; this allows much higher pH levels of the treatment bath to be reached than in the prior art, obtaining a greater swelling of the hide and skins during the treatment.

The increased swelling leads to a higher hair removal yield and a better quality of the finished product, as illustrated below.

Air removal agent and one or more activators are then added, which, thanks to a perhydrolysis reaction, allow the release of active oxygen to be increased, increasing the bleaching and/or cleaning and/or hair removal action within the process, at low temperatures.

In this way it is possible to ensure a sufficient development of hydroperoxide anions in order to complete the process even at temperatures in the order of 20° C., which are low enough to be tolerated by the proteins of the hides and skins.

By way of example, the NOBS (sodium nonanoyloxy-benzenesulfonate), or the TAED (tetramethylethylenediamine) are cited as activators; more specifically, the task of these activators is, as mentioned above, to combine with the hydroperoxide anion, which is naturally derived from the dissociation of hydrogen peroxide placed in aqueous solution.

The hydroperoxide anion alone, however, can exert its action only at temperatures above 60° C.; the addition of the activators allows the production of peroxyacids (peroxycarboxylic acids), for example peracetic acid, which is active even at lower temperatures, in the order of 20° C.; specifically, this occurs through a perhydrolysis reaction between the activators themselves and the hydrogen peroxide.

Another feature of fundamental importance for the implementation of the method according to the invention is the maintenance of the pH of the solution close to extremely basic values, specifically between 9 and 14 and, in particular, between 12 and 13.

In fact, only in this way is it possible to obtain, firstly, the maximum release of hydrogen peroxide by the compound of sodium carbonate-hydrogen peroxide (⅔); secondly, the basic environment and the action of the activating agents favour the creation of peroxyacids at advantageously low temperatures, in the order of 20° C., and in any case not higher than 30° C., making it possible to process hides and skins without altering them.

Moreover, at high pH levels it is possible to achieve a high swelling of the tissues which make up the hides and skin, up to values of 45-55%, which is necessary for the good release of interfibrillar proteins and therefore for a relaxation of the collagen structure, all to the advantage of the quality of the treated hide and skin.

In addition, a further advantageous feature of the invention emerges with reference to the European ADR regulations on the transport of dangerous substances by road; for the implementation of the method, in fact, it is possible to use the above-mentioned compounds or other equivalent compounds in the form of a mixture, to be introduced as such into the treatment bath.

Mixtures of this type will be produced in such a way as to generally comprise at least one perhydrate compound, at least one alkalizing agent, and at least one activator if the method is to be carried out at low temperatures (basically up to 30° C.); an example of a mixture consisting of sodium carbonate-hydrogen peroxide, sodium carbonate and TAED and/or NOBS, respectively, can be considered.

It will be understood how properly formulated variants of these mixtures can be stored and transported in a simple and easy manner, in particular so as to be exempt from the application of this safety regulation, which provides for limits on the maximum quantities of transportable substances; for the example mentioned, these limits would be 59% of sodium percarbonate, 5% of TAED and 36% of sodium carbonate.

It is clear how this makes the use of the mixtures described convenient, to the advantage of the practicality of use and implementation of the invention in question, resulting, in addition, to significant cost savings.

It is also clear that the perhydrate compound, the alkalizing agent and any activator can also be used individually and then mixed in the bath in the ratios indicated above and not necessarily constitute a single pre-mixed product to be added later.

By way of example, a preferred embodiment of the method according to the invention is described below, applicable at temperatures both below and above 30° C., with particular reference to the steps which distinguish it from the prior art.

Specifically, reference is made to the composition of the bath for treatment of the hides and skins, the preparation of which comprises the following steps in succession:

a. introduction of the hides and skins to be treated;
b. introduction of water in proportion to the weight of the hide and skin to be treated between 0 and 400% and, in particular, between 30% and 200%;
c. introduction of NaOH 30% (sodium hydroxide) in proportion to the weight of the hide and skin to be treated between 0% and 20%, or at least 0.01%, more specifically between 3% and 15%;
d. stirring the bath for a variable time, preferably 30 minutes;

e. introduction of 2($Na_2CO_3 \cdot 1.5H_2O_2$) (sodium carbonate-hydrogen peroxide (⅔)) in proportion to the weight of the hide and skin to be treated between 0% and 20%, or at least 0.01%, more particularly between 3% and 15%, preferably between 3.5% and 8% and, even more preferably, between 4% and 6%;

f. introduction of TAED and/or NOBS (tetramethylethylenediamine and/or sodium nonanoyloxybenzenesulfonate) in proportion to the weight of the hide and skin to be treated, between 0% and 10%, preferably from at least 0.01% up to 1%, and, even more preferably, about 0.25%;

g. addition of NaOH 30% (sodium hydroxide) in proportion to the weight of the hide and skin to be treated between 0% and 20%, or at least 0.01%, more specifically between 3% and 15% and, more preferably, between 8% and 12%;

h. stirring the bath for a variable time, from 0 to 48 hours, preferably between 4 and 24 hours, and even more preferably 8 hours.

More specifically, the use of activators is essential if you want to complete a low temperature process, that is, with a temperature not exceeding 30° C., to avoid damaging the hides and skins during the treatment.

Preferred intervals for the process parameters with which to conduct the process can be as follows:

temperature (° C.) between 15° C. and 40° C. and preferably between 20° C. and 35° C.; in particular, in the case of a low temperature process using activators, the preferred temperature range is reduced to around 20° C.

total duration (hours) between 0 and 48, preferably between 4 and 24 and even more preferably between 4 and 8;

pH between 0 and 14, in particular between 8 and 14, and preferably between 12 and 14.

The characteristics of the product for the oxidative hair removal treatment of animal hides and skins and of the relative method, which are the subject of the invention, clearly emerge from the description according to the invention, as do the advantages thereof.

The most relevant advantages include the following:

low environmental impact and eco-compatibility, both of the compounds used and of the intermediate products which are generated (for example, sludge which is not very soluble), in particular with a view to contamination and subsequent treatment of waste water;

possibility of carrying out the process at low temperatures, around 20° C., so as not to damage the hides and skins;

elimination of intermediate operations (for example, calcination) which are normally necessary to achieve an adequate quality of the treated hide and skin;

non-destructiveness of the process as regards both the finished product and the processing by-products;

better end result at the same process temperature, both in terms of hair removal and the quality of the treated hide and skin;

improved health and safety in the workplace;

ease of use of the compounds and the execution of the process;

possibility of recovery of waste by-products to make them usable in ancillary operations;

ease of storage and transport of the compounds;

low costs by virtue of the advantages achieved.

The invention described can be modified and adapted in several ways without thereby departing from the scope of the inventive concept of the accompanying claims.

Moreover, all the details can be replaced by other technically-equivalent elements.

Lastly, the components used, providing they are compatible with the specific use, as well as the dimensions, may vary according to requirements and the prior art.

The invention claimed is:

1. A method for the oxidative hair removal of animal hides and skins, the method comprising the following steps in succession:
(a) providing the hide and skin to be treated;
(b) providing water in proportion to the weight of the hide and skin to be treated varying between 0.8 and 4 to create a treatment bath containing said hide and skin to be treated, said bath being maintained at a temperature of between 15° C. and 40° C.;
(c) introducing into said treatment bath a perhydrate compound and at least one alkalizing agent, wherein said perhydrate compound and said at least one alkalizing agent are in a proportion to the weight of the hide and skin to be treated, the proportion varying between 0.0001 and 0.2, wherein a pH of said bath reaches between 9 and 14;
(c1) mixing said treatment bath for a time up until 30 minutes;
(c2) introducing in said treatment bath at least one activator in proportion to the weight of the hide and skin to be treated, wherein the proportion is between 0.0001 and 0.01; and
(c3) introducing 30% sodium hydroxide (NaOH) in a proportion to the weight of the hide and skin to be treated, wherein the proportion is between 0 and 0.2; and
(d) mixing said treatment bath containing said hide and skin to be treated for a period up until 48 hours.

2. The method according to claim 1, wherein said step (c) uses a quantity of said alkalizing agent, in proportion to the weight of the hide and skin to be treated, between 0.03 and 0.15.

3. The method according to claim 1, wherein said step (c) uses a quantity of the said perhydrate compound, in proportion to the weight of the hide and skin to be treated, between 0.03 and 0.15.

4. The method according to claim 1, wherein the hide and skin to be treated is introduced into a drum, a reel, or mixers.

5. The method according to claim 1, wherein in step (b), the bath is maintained at a temperature of around 20° C.

6. The method according to claim 1, wherein in step (c), the pH of said bath reaches between 12 and 14.

7. The method according to claim 1, wherein in step (c2), the at least one activator introduced in said treatment bath in proportion to the weight of the hide and skin to be treated is between 0.0001 and 0.0025.

8. The method according to claim 1, wherein in step (d), said mixing of said treatment bath containing said hide and skin to be treated is for a period between 4 and 24 hours.

9. The method according to claim 1, wherein in step (d), said mixing of said treatment bath containing said hide and skin to be treated is for a period between 4 and 8 hours.

10. The method according to claim 3, wherein said perhydrate compound, in proportion to the weight of the hide and skin to be treated is between 0.035 and 0.08.

11. The method of claim 1, wherein the at least one activator comprises sodium nonanoyloxybenzenesulfonate (NOBS) and/or tetramethylethylenediamine (TAED).

12. The method of claim 1, wherein the at least one alkalizing agent comprises sodium hydroxide and/or sodium carbonate.

\* \* \* \* \*